US012725469B2

(12) United States Patent
Fujii et al.

(10) Patent No.: US 12,725,469 B2
(45) Date of Patent: Sep. 1, 2026

(54) COMPONENT STATE ESTIMATION APPARATUS, COMPONENT STATE ESTIMATION METHOD, AND STORAGE MEDIUM

(71) Applicant: NEC Corporation, Tokyo (JP)

(72) Inventors: Asako Fujii, Tokyo (JP); Takuroh Kashima, Tokyo (JP); Yuki Chiba, Tokyo (JP); Norihito Oi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 18/838,282

(22) PCT Filed: Mar. 2, 2022

(86) PCT No.: PCT/JP2022/008770
§ 371 (c)(1),
(2) Date: Aug. 14, 2024

(87) PCT Pub. No.: WO2023/166586
PCT Pub. Date: Sep. 7, 2023

(65) Prior Publication Data
US 2025/0148844 A1 May 8, 2025

(51) Int. Cl.
*G07C 5/08* (2006.01)

(52) U.S. Cl.
CPC ......... *G07C 5/0808* (2013.01); *G07C 5/0816* (2013.01)

(58) Field of Classification Search
CPC ..... G07C 5/0808; G07C 5/0816; G06Q 10/00
See application file for complete search history.

(56) References Cited

U.S. PATENT DOCUMENTS

2016/0133070 A1* 5/2016 Ikeda .................. G07C 5/0808 701/31.4
2017/0131364 A1 5/2017 Hosaka et al.
2023/0226942 A1* 7/2023 Yang ...................... B60L 53/14 320/109

FOREIGN PATENT DOCUMENTS

JP H05-324953 A 12/1993
JP 5906336 B1 4/2016
JP 2019-161862 A 9/2019
JP 2021-002216 A 1/2021
(Continued)

OTHER PUBLICATIONS

JP Office Communication for JP Application No. 2024-504068, mailed on Jul. 1, 2025 with English Translation.
(Continued)

*Primary Examiner* — Michael V Kerrigan
(74) *Attorney, Agent, or Firm* — Sughrue Mion, PLLC

(57) ABSTRACT

A component state estimation apparatus (10) includes an acquisition unit (110) and an estimation unit (120). The acquisition unit (110) acquires state information and operating prediction data. The state information indicates a state of a component included in a product. The operating prediction data acquire operating prediction data indicating a prediction result of an operating state of the product until after a lapse of a predetermined period of time. The estimation unit (120) estimates a deterioration state of the component after a predetermined period of time has elapsed by using the state information and the operating prediction data. The estimation unit (120) may further estimate a deterioration state by using track record data about an operating state of the product.

11 Claims, 9 Drawing Sheets

(56) References Cited

FOREIGN PATENT DOCUMENTS

| | | | |
|---|---|---|---|
| JP | 2021-110998 | A | 8/2021 |
| JP | 2021-124761 | A | 8/2021 |
| WO | 2016/002398 | A1 | 1/2016 |
| WO | 2021/059950 | A1 | 4/2021 |

OTHER PUBLICATIONS

International Search Report for PCT Application No. PCT/JP2022/008770, mailed on May 24, 2022.

* cited by examiner

FIG. 7
YOU ARE RECOMMENDED TO
EXCHANGE COMPONENT A BY MAY 1ST.
PLEASE KEEP OPERATING TIME OF
PRODUCT IN APRIL WITHIN 40 HOURS.
YOU ARE RECOMMENDED TO
SET OPERATING SCHEDULE
OF PRODUCT AS FOLLOWS.
APRIL 1ST: 10:00 TO 16:00
APRIL 2ND: 13:00 TO 16:00
APRIL 3RD: 10:00 TO 16:00

COMPONENT STATE ESTIMATION APPARATUS, COMPONENT STATE ESTIMATION METHOD, AND STORAGE MEDIUM

This application is a National Stage Entry of PCT/JP2022/008770 filed on Mar. 2, 2022, the contents of all of which are incorporated herein by reference, in their entirety.

TECHNICAL FIELD

The present invention relates to a component state estimation apparatus, a component state estimation system, a component state estimation method, and a storage medium.

BACKGROUND ART

In order to manage a product formed of a plurality of products, it is important to recognize a state of each of the components. Patent Document 1 discloses a server that manages user equipment. The server acquires time-series data about detection information of a sensor installed in the user equipment, and analyzes the time-series data. Then, the server generates a message explaining a usage improvement point for extending a life of the user equipment and reducing a possibility of occurrence of a failure, and transmits the generated message to the user equipment.

RELATED DOCUMENT

Patent Document

Patent Document 1: Japanese Patent Application Publication No. 2021-110998

DISCLOSURE OF THE INVENTION

Technical Problem

In order to manage a product, it is important to estimate a future deterioration state of a component included in the product. However, Patent Document 1 described above does not disclose estimation of a future deterioration state of a component.

One example of an object of the present invention is, in view of the problem described above, to provide a component state estimation apparatus, a component state estimation system, a component state estimation method, and a storage medium that can estimate a future deterioration state of a component included in a product.

Solution to Problem

One aspect of the present invention provides a component state estimation apparatus including:

an acquisition unit that acquires state information indicating a state of a component included in a product, and also acquires operating prediction data indicating a prediction result of an operating state of the product until after a lapse of a predetermined period of time: and an estimation unit that estimates a deterioration state of the component after a predetermined period of time has elapsed by using the state information and the operating prediction data.

One aspect of the present invention provides a component state estimation system including:

a communication apparatus mounted on a product: and a component state estimation apparatus, wherein the communication apparatus transmits state information indicating a state of a component included in the product to the component state estimation apparatus, and the component state estimation apparatus includes an acquisition unit that acquires the state information, and operating prediction data indicating a prediction result of an operating state of the product until after a lapse of a predetermined period of time; and an estimation unit that estimates a deterioration state of the component after a predetermined period of time has elapsed by using the state information and the operating prediction data.

One aspect of the present invention provides a component state estimation method including, by a computer:

acquiring state information indicating a state of a component included in a product, and also acquiring operating prediction data indicating a prediction result of an operating state of the product until after a lapse of a predetermined period of time: and estimating a deterioration state of the component after a predetermined period of time has elapsed by using the state information and the operating prediction data.

One aspect of the present invention provides a computer-readable storage medium storing a program causing a computer to perform:

acquisition processing of acquiring state information indicating a state of a component included in a product, and also acquiring operating prediction data indicating a prediction result of an operating state of the product until after a lapse of a predetermined period of time: and estimation processing of estimating a deterioration state of the component after a predetermined period of time has elapsed by using the state information and the operating prediction data.

Advantageous Effects of Invention

One aspect of the present invention can provide a component state estimation apparatus, a component state estimation system, a component state estimation method, and a storage medium that can estimate a future deterioration state of a component included in a product.

EXAMPLE EMBODIMENT

Hereinafter, example embodiments of the present invention will be described with reference to the drawings. Note that, in all of the drawings, a similar component has a similar reference sign, and description thereof will be appropriately omitted.

Figure 1:
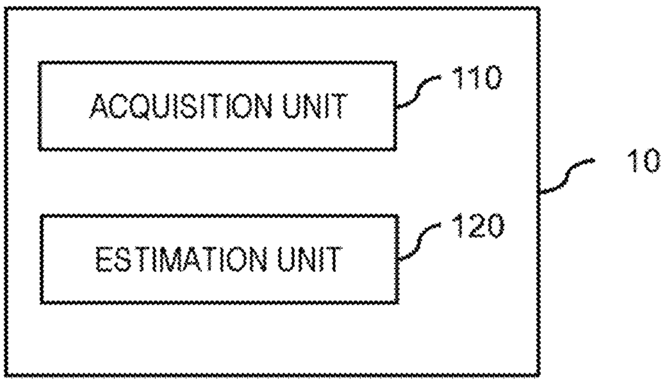
FIG. 1 is a diagram illustrating an overview of a component state estimation apparatus according to an example embodiment.

FIG. 1 is a diagram illustrating an overview of a component state estimation apparatus 10 according to an example embodiment. The component state estimation apparatus 10 includes an acquisition unit 110 and an estimation unit 120.

The acquisition unit 110 acquires state information and operating prediction data. The state information indicates a state of a component included in a product. The operating prediction data acquire operating prediction data indicating a prediction result of an operating state of a product until after a lapse of a predetermined period of time.

The estimation unit 120 estimates a deterioration state of a component after a predetermined period of time has elapsed by using the state information and the operating prediction data.

When the component state estimation apparatus 10 is used, a deterioration state of a component after a predetermined period of time has elapsed can be estimated by using the state information and the operating prediction data.

Figure 2:
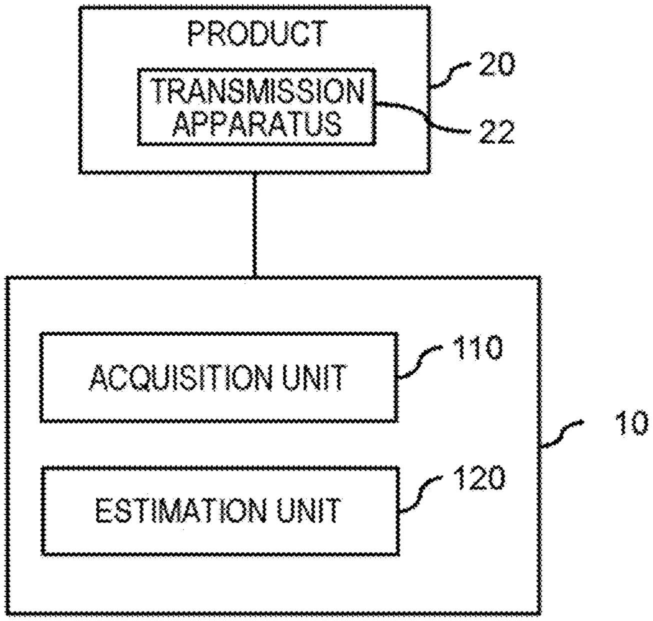
FIG. 2 is a diagram illustrating one example of a usage environment of the component state estimation apparatus illustrated in FIG. 1.

FIG. 2 is a diagram illustrating one example of a usage environment of the component state estimation apparatus 10 illustrated in FIG. 1. In the example illustrated in FIG. 2, the component state estimation apparatus 10 acquires state information from a transmission apparatus 22 mounted on a product 20. Then, the component state estimation apparatus 10 and the transmission apparatus 22 are at least a part of a component state estimation system.

Hereinafter, a detailed example of the component state estimation apparatus 10 will be described.

Figure 3:
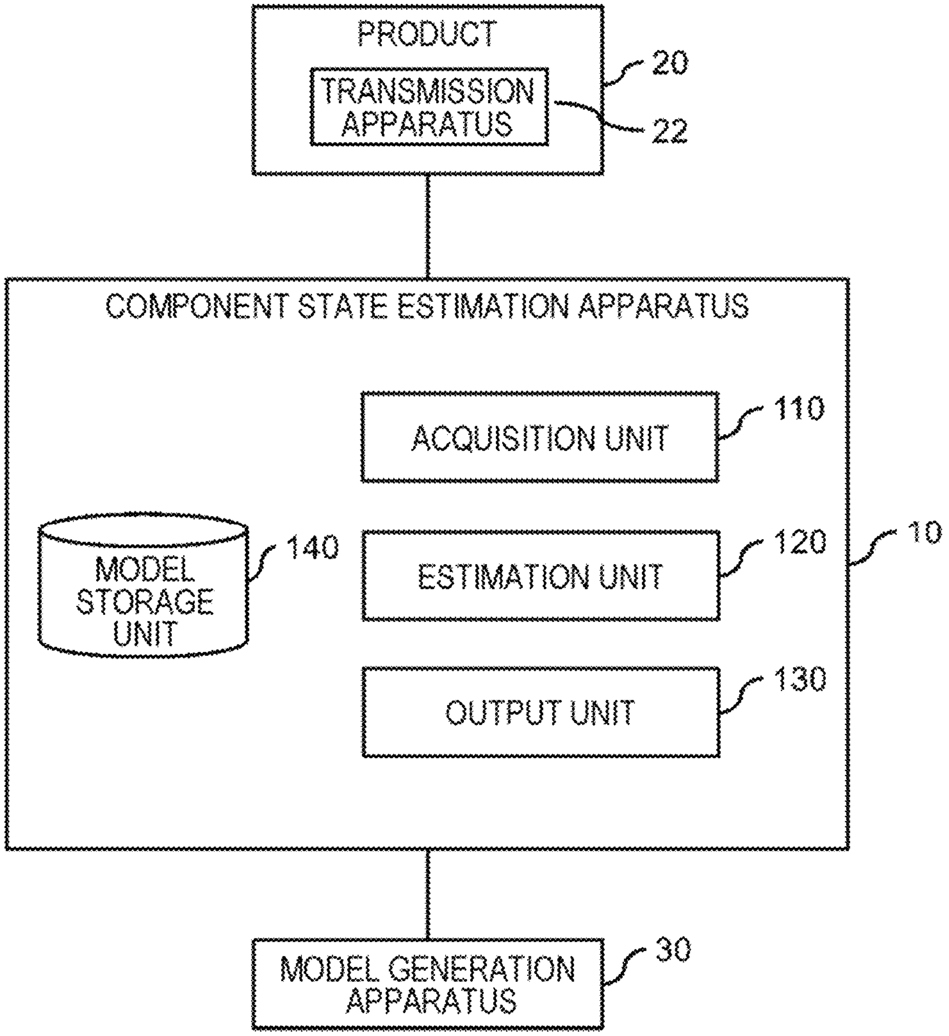
FIG. 3 is a diagram illustrating a detailed example of a usage environment of the component state estimation apparatus.

FIG. 3 is a diagram illustrating a detailed example of a usage environment of the component state estimation apparatus 10. The component state estimation apparatus 10 is possessed by, for example, at least one of a user, an owner, and a manager of the product 20. The component state estimation apparatus 10 may be a portable communication terminal such as, for example, a smartphone and a tablet terminal, and may be a stationary apparatus.

The product 20 includes a plurality of components. One example of the product 20 is a vehicle such as a car, a car of a train, an airplane, and a portable communication terminal. However, the product 20 is not limited to these. When the product 20 is a car, a component is at least one of a battery, engine oil, a windshield wiper, a headlight, a belt, a tire, and a brake pad. Further, the component is also not limited to these.

The product 20 includes the transmission apparatus 22. The transmission apparatus 22 transmits state information. The state information indicates a state of a component included in the product 20. The state information is, for example, a detected value of a sensor attached to a component and a value computed by using the detected value.

The sensor is, for example, at least one of a voltage sensor, a current sensor, a power sensor, a temperature sensor, and a density sensor, but is not limited to these. For example, when a component is a battery; the state information is at least one of an output voltage, an output current, output power, and an SOC of the battery.

Further, when the state information is computed by using a detected value of a sensor, the state information is computed by using, for example, a past value of the detected value of the sensor. As one example, the state information is a ratio of a detected value of a current sensor to a detected value of a sensor in a state where a component is new. Further, the state information may be computed by using a history of detected values of the sensor.

Herein, various timings at which the transmission apparatus 22 transmits the state information are used. For example, the transmission apparatus 22 may transmit the state information when the transmission apparatus 22 acquires information indicating a request for the state information from the component state estimation apparatus 10. Further, the transmission apparatus 22 may transmit the state information at a predetermined timing. Further, the transmission apparatus 22 may regularly transmit the state information. Note that, when the product 20 is a vehicle, one example of the timing is a timing at which a vehicle inspection or a regular inspection is performed.

Further, when the product 20 is a vehicle, the transmission apparatus 22 may transmit the state information when the vehicle is stopped. Herein, a "vehicle is stopped" means that an engine is stopped when the vehicle includes the engine, and means that a power supply to a motor is not performed or a control unit that controls the power supply is turned off when the vehicle is an electric vehicle.

Further, the component state estimation apparatus 10 is used together with a model generation apparatus 30 in addition to the transmission apparatus 22. When the estimation unit 120 of the component state estimation apparatus 10 estimates a deterioration state of a component after a predetermined period of time has elapsed, the estimation unit 120 uses a model generated by machine learning or statistical processing. The model generation apparatus 30 generates the model and stores the model in the component state estimation apparatus 10. One example of the machine learning performed by the model generation apparatus 30 is heterogeneous mixed learning. One example of the statistical processing performed by the model generation apparatus 30 is a multiple regression analysis.

Then, as described above, the component state estimation apparatus 10 includes the acquisition unit 110 and the estimation unit 120. The component state estimation apparatus 10 further includes an output unit 130 and a model storage unit 140.

The model storage unit 140 stores a model generated by the model generation apparatus 30.

The acquisition unit 110 acquires information to be an explanatory variable of a model to be used by the estimation unit 120. The information includes at least the state information and the operating prediction data. Note that, the acquisition unit 110 may acquire information needed for generating the operating prediction data instead of the operating prediction data.

The operating prediction data are, for example, schedule information indicating an operating schedule of the product 20.

Further, one example of the information needed for generating the operating prediction data is current month and day. In this case, the acquisition unit 110 further generates the operating prediction data by using past track record data about an operating state of the product 20. For example, it is assumed that the acquisition unit 110 acquires track record data about month and day having a similar condition to that of current month and day among pieces of track record data, and the track record data or a result of performing the statistical processing on the track record data is assumed to be the operating prediction data. Herein, "month and day having a similar condition to that of current month and day" indicates that, for example, a unit is the same such as the beginning, the middle, and the end of a month, the season is the same, and month and day are precisely the same (for example, one year ago).

Then, when the product 20 is a vehicle and a component being a target is a battery, the operating prediction data include, for example, at least one of at least one of an average value and an upper limit value of a traveling distance, a traveling time, and a speed, an operating time of a windshield wiper, an operating time of a headlight, an operating time and a setting temperature of an air conditioner, and the number of times an engine is activated (including the number of times of an idling stop of an engine).

Note that, the acquisition unit 110 acquires track record data about an operating state from a storage unit that stores the operating history. The storage unit may further store past state information. The storage unit may be located in the component state estimation apparatus 10, in the product 20, or outside the component state estimation apparatus 10 and the product 20.

Note that, an explanatory variable of a model to be used by the estimation unit 120 may further include track record data about an operating state of the product 20. In this case, the track record data include, for example, a date and time and a length in which the product 20 has been operating. The track record data may further include information indicating a load that has been applied to the product 20 during the operation. When the product 20 is a vehicle, the track record data preferably include, for example, at least one of at least one of an average value and an upper limit value of a traveling distance, a traveling time, and a speed, an operating track record of a windshield wiper, an operating track record of a headlight, an operating time and a setting temperature of an air conditioner, and the number of times an engine is activated (including the number of times of an idling stop of an engine).

An explanatory variable of a model to be used by the estimation unit 120 may further include at least one of past state information about the product 20 and a usage environment (for example, temperature and humidity) of the product 20.

The estimation unit 120 estimates a deterioration state of a component by using information acquired by the acquisition unit 110 and a model stored in the model storage unit 140. Hereinafter, information indicating an estimation result will be described as estimation information.

The estimation information indicates a deterioration state of a component after a predetermined period of time has elapsed. The predetermined period of time is, for example, one day, one week, two weeks, one month, three months, or six months, but is not limited to these. The estimation information is indicated by, for example, a value indicating a deterioration state of a component. Hereinafter, the value will be described as a degree of deterioration. The degree of deterioration is, for example, a proportion of performance at that point in time to initial performance, for example, an SOH in a battery or a degree of decrease in strength of a timing belt, but is not limited to these.

The estimation information may indicate an estimation result of transition of a deterioration state of a component. In this case, as one example of the estimation information, a horizontal axis is an elapsed time (for example, elapsed month and day) from a current time, and a vertical axis is a degree of deterioration of a component.

The output unit 130 outputs the estimation information generated by the estimation unit 120. For example, the output unit 130 outputs the estimation information to a display included in the component state estimation apparatus 10 or an external printing apparatus.

Further, the output unit 130 performs a predetermined output when the estimation information satisfies a reference. The reference used herein indicates that a component has deteriorated and it is better to exchange the component. For example, when the product 20 is a vehicle and a component is a battery; one example of the reference for performing the predetermined output is that at least one of an SOC and a voltage included in the estimation information falls below a reference value. In this case, the predetermined output performed by the output unit 150 indicates a possibility that the vehicle may not be activated when a remaining capacity of the battery runs short.

The reference value is set by, for example, a user of the component state estimation apparatus 10. Further a plurality of the reference values may be set. In this case, a first reference value indicates that, for example, a tendency toward deterioration is appearing, and a reference value after the first reference value, i.e., a second reference value indicates a possibility that deterioration is proceeding. Further, a reference value after the second reference value, i.e., a third reference value indicates that it is better to immediately exchange a component.

Note that, a detailed example of an output condition of predetermined information is, for example, at least one of the following examples. In any of the examples, the estimation information of the estimation unit 120 includes an estimated value of a parameter indicating a state of a component, for example, an estimated value of at least one of an SOC and an output voltage of a battery.

a) A case where an estimated value associated with a current date and time falls below a reference value. In this case, the predetermined output indicates that it is better to exchange a component immediately, depending on a setting content of the reference value.

b) A case where an estimated value associated with "after a predetermined period of time since a current date and time" falls below a reference value. This is a case where a component does not currently need to be exchanged, but it is better to exchange the component after a predetermined period of time, for example, after one month.

The predetermined information output from the output unit 130 preferably includes information indicating a timing at which a component needs to be exchanged. The timing is, for example, a timing at which an estimated value of a parameter indicating a state of a component falls below a reference value.

Further, the predetermined information output from the output unit 130 may include reference information that needs to be referred in order to suppress deterioration of a component. The reference information includes, for example, information about a usage method and an operating timing of the product 20, for example, a guidance on an operating timing and an operating time. The guidance may include, for example, an operating schedule of the product 20.

For example, when the product 20 is a vehicle including an engine and a component is a battery, it is preferable that the vehicle is regularly operating and the vehicle is not operating for a long time in order to suppress deterioration of the battery. Thus, the output unit 130 may generate, as the reference information, an operating schedule in which the vehicle is regularly operating and the vehicle is not operating for a long time. For example, when the vehicle is a vehicle for distribution, an operating schedule generated by the output unit 130 is delivery plan information about an article by the vehicle. Note that, the delivery plan information includes at least a departure point, a destination point, and a way point by month and day. Further, the delivery plan information may further include at least one of route information from the departure point to the destination point, an arrival time at the way point, and an arrival time at the destination point.

Note that, the component state estimation apparatus 10 may be a cloud server. In this case, the output unit 130 outputs the estimation information to a terminal possessed by at least one of a user, an owner, and a manager of the product 20, and also performs the predetermined output described above. Then, the terminal displays the estimation information, and also displays the predetermined output.

Figure 4:
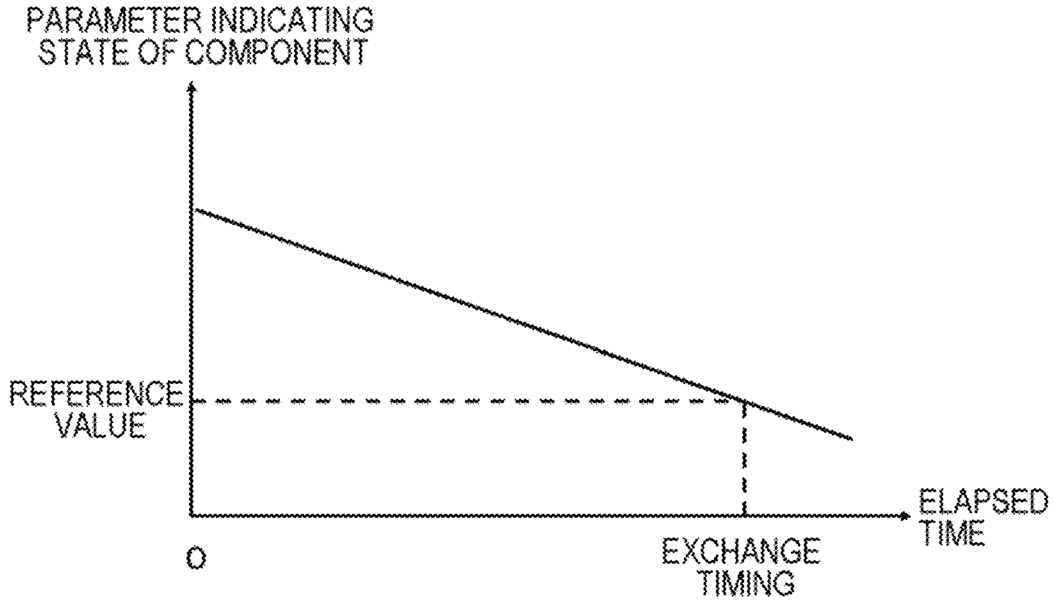
FIG. 4 is a diagram schematically illustrating one example of estimation information.

FIG. 4 is a diagram schematically illustrating one example of the estimation information. In the example illustrated in FIG. 4, the estimation information indicates an estimation result of transition of a parameter indicating a state of a component, for example, an estimated value of transition of an SOC and an output voltage of a battery: An origin of a graph indicating the information is, for example, a current time. Then, a timing at which the parameter falls below a reference value indicates a timing at which it is estimated to be better to exchange a component.

Figure 5:
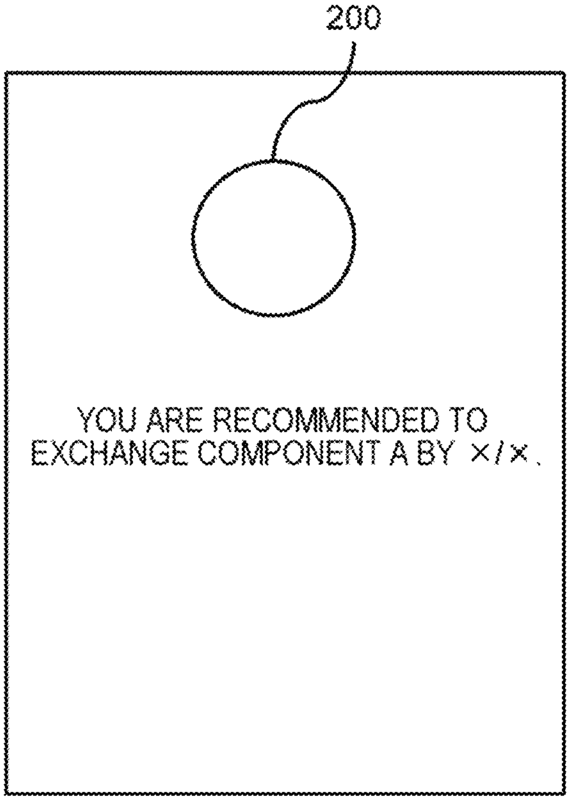
FIG. 5 is a diagram illustrating a first example of information output from an output unit.

FIG. 5 is a diagram illustrating a first example of information output from the output unit 130. In the example illustrated in FIG. 5, the output unit 130 outputs, as the predetermined information, information indicating a timing at which it is estimated to be better to exchange a component.

Further, in FIG. 5, the information output from the output unit 130 is displayed on a display. The display includes a mark 200. The output unit 130 changes a display manner, for example, at least one of a color, a size, a pattern, and a shape of the mark 200 according to an estimation result of a deterioration state of a component after a predetermined period has elapsed. For example, when an estimated value of a degree of deterioration of a component after a predetermined period of time has elapsed is equal to or less than the first reference value, the output unit 130 displays the mark 200 in a manner in which a component has no problem, for example, in blue. Further, when the estimated value is equal to or more than the first reference value and equal to or less than the second reference value, the output unit 130 displays the mark 200 in a manner in which there is a possibility that a problem may occur in a component, for example, in yellow. Furthermore, when the estimated value is equal to or more than the second reference value, the output unit 130 displays the mark 200 in a manner in which there is a high possibility that a problem may occur in a component, for example, in red.

Figure 6:
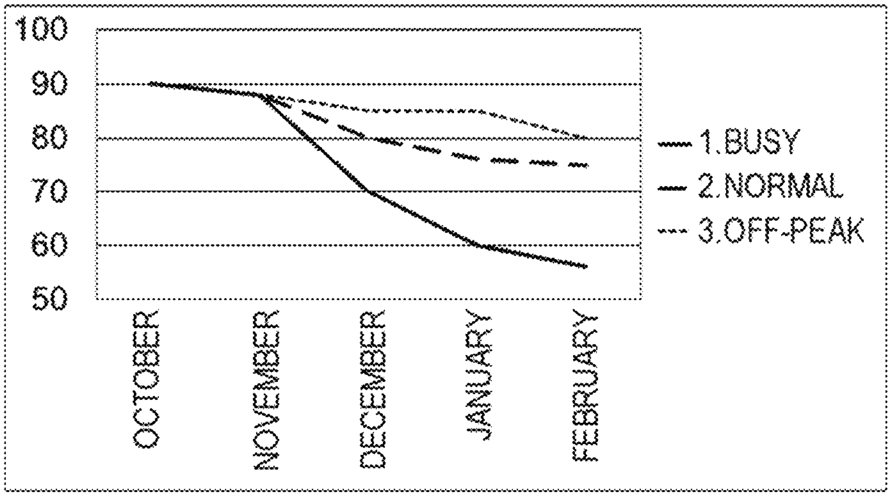
FIG. 6 is a diagram illustrating a second example of information output from the output unit.

FIG. 6 is a diagram illustrating a second example of information output from the output unit 130. In FIG. 6, a vertical axis indicates an estimated value of a degree of deterioration. In the example illustrated in FIG. 6, the estimation unit 120 generates the estimation information by using each of a plurality of pieces of operating prediction data, such as operating prediction data indicating a busy state, operating prediction data in a normal state, and operating prediction data indicating an off-peak state. Then, the output unit 130 includes the plurality of pieces of estimation information in the predetermined information. In the example illustrated in FIG. 6, the plurality of pieces of estimation information are displayed in an overlapping manner in the same graph.

Figure 7:
FIG. 7 is a diagram illustrating a third example of information output from the output unit.

FIG. 7 is a diagram illustrating a third example of information output from the output unit 130. In the example illustrated in FIG. 7, the output unit 130 includes, in the predetermined information, reference information, i.e., information that needs to be referred in order to suppress deterioration of a component. In the example illustrated in FIG. 7, the reference information includes an upper limit value of an operating time of the product 20 in a unit time (for example, one month) and an operating schedule of the product 20.

Note that, the output unit 130 may simultaneously output the information illustrated in FIG. 6 and the information illustrated in FIG. 7.

Figure 8:
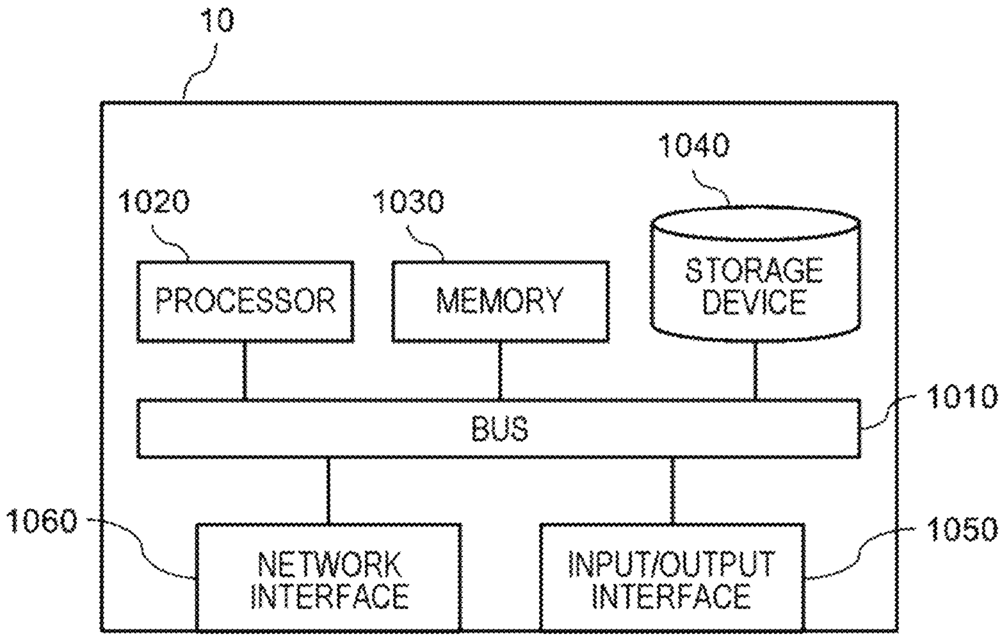
FIG. 8 is a diagram illustrating a hardware configuration example of the component state estimation apparatus.

FIG. 8 is a diagram illustrating a hardware configuration example of the component state estimation apparatus 10. The component state estimation apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method for connecting the processor 1020 and the like to one another is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a removable medium such as a memory card, a read only memory (ROM), or the like. The storage device 1040 stores a program module that achieves each function (for example, the acquisition unit 110, the estimation unit 120, and the output unit 130) of the component state estimation apparatus 10. The processor 1020 reads each program module onto the memory 1030 and executes the program module, and each function associated with the program module is achieved. Further, the storage device 1040 also functions as the model storage unit 140.

The input/output interface 1050 is an interface for connecting the component state estimation apparatus 10 and various types of input/output equipment.

The network interface 1060 is an interface for connecting the component state estimation apparatus 10 to a network. The network is, for example, a local area network (LAN) and a wide area network (WAN). A method of connection to the network by the network interface 1060 may be wireless connection or wired connection. The component state estimation apparatus 10 communicates with the transmission apparatus 22 and the model generation apparatus 30 via the input/output interface 1060.

Figure 9:
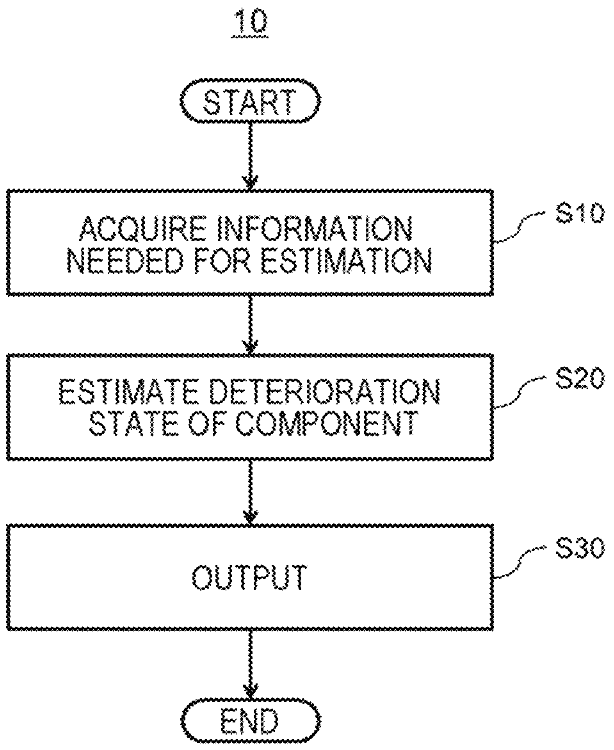
FIG. 9 is a flowchart illustrating one example of processing performed by the component state estimation apparatus.

FIG. 9 is a flowchart illustrating one example of processing performed by the component state estimation apparatus 10. The transmission apparatus 22 of the product 20 transmits state information to the component state estimation apparatus 10 at a predetermined timing. One example of the timing is, for example, a timing at which the product 20 changes from an operating state to a stop state, which is not limited thereto, and may be, for example, a timing at which a regular inspection is performed on the product 20. The acquisition unit 110 of the component state estimation apparatus 10 acquires the state information. Further, the acquisition unit 110 also acquires other information needed for generation of estimation information. One example of the information is operating prediction data or information needed for generating the operating prediction data (step S10).

Next, the estimation unit 120 of the component state estimation apparatus 10 generates the estimation information. As described above, the estimation information indicates a deterioration state of a component after a predetermined period of time has elapsed (step S20). Details of the processing performed by the estimation unit 120 are as described by using FIG. 3.

Next, the output unit 130 of the component state estimation apparatus 10 outputs the estimation information (step S30). Details of the processing performed by the output unit 130 are as described by using FIGS. 3 to 6.

As described above, according to the present example embodiment, the acquisition unit 110 of the component state estimation apparatus 10 acquires state information and operating prediction data. Then, the estimation unit 120 of the component state estimation apparatus 10 estimates a deterioration state of a component after a predetermined period of time has elapsed by using a model. Then, an explanatory variable of the model includes at least the state information and the operating prediction data. Thus, when the component state estimation apparatus 10 is used, a future deterioration state of a component included in the product 20 can be estimated.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. A component state estimation apparatus including:
   an acquisition unit that acquires state information indicating a state of a component included in a product, and also acquires operating prediction data indicating a prediction result of an operating state of the product until after a lapse of a predetermined period of time; and
   an estimation unit that estimates a deterioration state of the component after a predetermined period of time has elapsed by using the state information and the operating prediction data.
2. The component state estimation apparatus according to supplementary note 1 described above, wherein
   the estimation unit further estimates the deterioration state by using track record data about an operating state of the product.
3. The component state estimation apparatus according to supplementary note 1 or 2 described above, wherein
   the acquisition unit generates the operating prediction data by using at least one of schedule information indicating an operating schedule of the product, and current month and day
4. The component state estimation apparatus according to any one of supplementary notes 1 to 3 described above, further including
   an output unit that performs a predetermined output when an estimation result by the estimation unit satisfies a reference.
5. The component state estimation apparatus according to supplementary note 4 described above, wherein
   the predetermined output includes information indicating a timing at which the component needs to be exchanged.
6. The component state estimation apparatus according to supplementary note 4 or 5 described above, wherein
   the predetermined output includes reference information that needs to be referred in order to suppress deterioration of the component.
7. The component state estimation apparatus according to supplementary note 6 described above, wherein
   the reference information is related to an operating timing of the product.
8. The component state estimation apparatus according to supplementary note 7 described above, wherein
   the product is a vehicle for distribution, and
   the component state estimation apparatus further includes a delivery plan generation unit that generates delivery plan information by the vehicle by using the reference information.
9. The component state estimation apparatus according to any one of supplementary notes 1 to 8 described above, wherein
   the product is a vehicle, and
   the component is at least one of a battery, engine oil, a windshield wiper, a headlight, a belt, a tire, and a brake pad.
10. The component state estimation apparatus according to supplementary note 9 described above, wherein
   the component is a battery, and
   the operating prediction data include at least one of at least one of an average value and an upper limit value of a traveling distance, a traveling time, and a speed, an operating time of a windshield wiper, an operating time of a headlight, an operating time and a setting temperature of an air conditioner, and a number of times an engine is activated (including a number of times of an idling stop of an engine).
11. A component state estimation system including:
   a communication apparatus mounted on a product; and
   a component state estimation apparatus, wherein
   the communication apparatus transmits state information indicating a state of a component included in the product to the component state estimation apparatus, and
   the component state estimation apparatus is the component state estimation apparatus according to any of supplementary notes 1 to 10 described above.
12. A component state estimation method including,
   by a computer:
   acquiring state information indicating a state of a component included in a product, and also acquiring operating prediction data indicating a prediction result of an operating state of the product until after a lapse of a predetermined period of time; and estimating a deterioration state of the component after a predetermined period of time has elapsed by using the state information and the operating prediction data.

13. The component state estimation method according to supplementary note 12 described above, further including,
by the computer, further estimating the deterioration state by using track record data about an operating state of the product.

14. The component state estimation method according to supplementary note 12 or 13 described above, further including,
by the computer, generating the operating prediction data by using at least one of schedule information indicating an operating schedule of the product, and current month and day.

15. The component state estimation method according to any one of supplementary notes 12 to 14 described above, further including,
by the computer, performing a predetermined output when a estimation result satisfies a reference.

16. The component state estimation method according to supplementary note 15 described above, wherein
the predetermined output includes information indicating a timing at which the component needs to be exchanged.

17. The component state estimation method according to supplementary note 15 or 16 described above, wherein
the predetermined output includes reference information that needs to be referred in order to suppress deterioration of the component.

18. The component state estimation method according to supplementary note 17 described above, wherein
the reference information is related to an operating timing of the product.

19. The component state estimation method according to supplementary note 18 described above, wherein
the product is a vehicle for distribution, and
the component state estimation method further includes, by the computer, generating delivery plan information by the vehicle by using the reference information.

20. The component state estimation method according to any one of supplementary notes 12 to 19 described above, wherein
the product is a vehicle, and
the component is at least one of a battery, engine oil, a windshield wiper, a headlight, a belt, a tire, and a brake pad.

21. The component state estimation method according to supplementary note 20 described above, wherein
the component is a battery, and
the operating prediction data include at least one of at least one of an average value and an upper limit value of a traveling distance, a traveling time, and a speed, an operating time of a windshield wiper, an operating time of a headlight, an operating time and a setting temperature of an air conditioner, and a number of times an engine is activated (including a number of times of an idling stop of an engine).

22. A computer-readable storage medium storing a program causing a computer to perform:
acquisition processing of acquiring state information indicating a state of a component included in a product, and also acquiring operating prediction data indicating a prediction result of an operating state of the product until after a lapse of a predetermined period of time; and
estimation processing of estimating a deterioration state of the component after a predetermined period of time has elapsed by using the state information and the operating prediction data.

23. The storage medium according to supplementary note 22 described above, wherein
the estimation processing further estimates the deterioration state by using track record data about an operating state of the product.

24. The storage medium according to supplementary note 22 or 23 described above, wherein
the acquisition processing generates the operating prediction data by using at least one of schedule information indicating an operating schedule of the product, and current month and day.

25. The storage medium according to any one of supplementary notes 22 to 24 described above, wherein
the program further causes the computer to perform output processing of performing a predetermined output when an estimation result by the estimation processing satisfies a reference.

26. The storage medium according to supplementary note 25 described above, wherein
the predetermined output includes information indicating a timing at which the component needs to be exchanged.

27. The storage medium according to supplementary note 25 or 26 described above, wherein
the predetermined output includes reference information that needs to be referred in order to suppress deterioration of the component.

28. The storage medium according to supplementary note 27 described above, wherein
the reference information is related to an operating timing of the product.

29. The storage medium according to supplementary note 28 described above, wherein
the product is a vehicle for distribution, and
the program further causes the computer to perform delivery plan generation processing of generating delivery plan information by the vehicle by using the reference information.

30. The storage medium according to any one of supplementary notes 22 to 29 described above, wherein
the product is a vehicle, and
the component is at least one of a battery, engine oil, a windshield wiper, a headlight, a belt, a tire, and a brake pad.

31. The storage medium according to supplementary note 30 described above, wherein
the component is a battery, and
the operating prediction data include at least one of at least one of an average value and an upper limit value of a traveling distance, a traveling time, and a speed, an operating time of a windshield wiper, an operating time of a headlight, an operating time and a setting temperature of an air conditioner, and a number of times an engine is activated (including a number of times of an idling stop of an engine).

32. The program according to supplementary notes 22 to 31 described above.

REFERENCE SIGNS LIST

10 Component state estimation apparatus
20 Product

22 Transmission apparatus
30 Model generation apparatus
110 Acquisition unit
120 Estimation unit
130 Output unit
140 Model storage unit

What is claimed is:

1. A component state estimation apparatus comprising:
at least one memory configured to store instructions; and
at least one processor configured to execute the instructions to perform operations comprising:
acquiring state information indicating a state of a component included in a product;
acquiring operating prediction data indicating a prediction result of an operating state of the product until a predetermined period of time has elapsed; and
estimating a deterioration state of the component after the predetermined period of time has elapsed by using the state information and the operating prediction data,
wherein the acquiring operating prediction data comprises generating the operating prediction data based on schedule information indicating an operating schedule of the product.

2. The component state estimation apparatus according to claim 1, wherein the operations further comprise
estimating the deterioration state by using track record data about an operating state of the product.

3. The component state estimation apparatus according to claim 1, wherein the operations further comprise
performing a predetermined output when an estimation result satisfies a reference.

4. The component state estimation apparatus according to claim 3, wherein
the predetermined output includes information indicating a timing at which the component needs to be exchanged.

5. The component state estimation apparatus according to claim 3, wherein
the predetermined output includes reference information that needs to be referred in order to suppress deterioration of the component.

6. The component state estimation apparatus according to claim 5, wherein
the reference information is related to an operating timing of the product.

7. The component state estimation apparatus according to claim 6, wherein
the product is a vehicle for distribution, and
the operations further comprise generating delivery plan information by the vehicle by using the reference information.

8. The component state estimation apparatus according to claim 1, wherein
the product is a vehicle, and
the component is at least one of a battery, engine oil, a windshield wiper, a headlight, a belt, a tire, and a brake pad.

9. The component state estimation apparatus according to claim 8, wherein
the component is a battery, and
the operating prediction data include at least one of (i) an average value or an upper limit value of a traveling distance, a traveling time, and a speed, (ii) an operating time of a windshield wiper, (iii) an operating time of a headlight, (iv) an operating time and a setting temperature of an air conditioner, and (v) a number of times an engine is activated (including a number of times of an idling stop of an engine).

10. A component state estimation method comprising, by a computer:
acquiring state information indicating a state of a component included in a product;
acquiring operating prediction data indicating a prediction result of an operating state of the product until a predetermined period of time has elapsed; and
estimating a deterioration state of the component after the predetermined period of time has elapsed by using the state information and the operating prediction data,
wherein the acquiring operating prediction data comprises generating the operating prediction data based on schedule information indicating an operating schedule of the product.

11. A computer-readable storage medium storing a program causing a computer to perform operations comprising:
acquiring state information indicating a state of a component included in a product;
acquiring operating prediction data indicating a prediction result of an operating state of the product until a predetermined period of time has elapsed; and
estimating a deterioration state of the component after the predetermined period of time has elapsed by using the state information and the operating prediction data,
wherein the acquiring operating prediction data comprises generating the operating prediction data based on schedule information indicating an operating schedule of the product.

* * * * *